United States Patent
Bangerter et al.

(10) Patent No.: US 10,634,351 B2
(45) Date of Patent: Apr. 28, 2020

(54) COMBUSTOR PANEL T-JUNCTION COOLING

(71) Applicant: United Technologies Corporation, Hartford, CT (US)

(72) Inventors: James P. Bangerter, Manchester, CT (US); Robert Sze, Mississauga (CA)

(73) Assignee: United Technologies Corporation, Farmington, CT (US)

(*) Notice: Subject to any disclaimer, the term of this patent is extended or adjusted under 35 U.S.C. 154(b) by 453 days.

(21) Appl. No.: 14/781,466

(22) PCT Filed: Apr. 10, 2014

(86) PCT No.: PCT/US2014/033657
§ 371 (c)(1),
(2) Date: Sep. 30, 2015

(87) PCT Pub. No.: WO2014/169127
PCT Pub. Date: Oct. 16, 2014

(65) Prior Publication Data
US 2016/0054001 A1 Feb. 25, 2016

Related U.S. Application Data

(60) Provisional application No. 61/811,501, filed on Apr. 12, 2013.

(51) Int. Cl.
*F23R 3/00* (2006.01)
*F23R 3/04* (2006.01)
*F23R 3/06* (2006.01)

(52) U.S. Cl.
CPC ............ *F23R 3/045* (2013.01); *F23R 3/002* (2013.01); *F23R 3/005* (2013.01); *F23R 3/007* (2013.01); *F23R 3/06* (2013.01); *F23R 2900/03041* (2013.01); *F23R 2900/03042* (2013.01); *F23R 2900/03044* (2013.01); *Y02T 50/675* (2013.01)

(58) Field of Classification Search
CPC ................ F23R 3/002; F23R 3/06; F23R 2900/03041–03045
See application file for complete search history.

(56) References Cited

U.S. PATENT DOCUMENTS

| | | | |
|---|---|---|---|
| 6,145,319 A * | 11/2000 | Burns | F23R 3/002 60/754 |
| 6,470,685 B2 | 10/2002 | Pidcock et al. | |
| 6,901,757 B2 | 6/2005 | Gerendas | |
| 7,065,971 B2 | 6/2006 | Bellucci et al. | |
| 7,093,441 B2 | 8/2006 | Burd et al. | |

(Continued)

FOREIGN PATENT DOCUMENTS

| | | |
|---|---|---|
| EP | 1022437 | 7/2000 |
| WO | 2006111508 | 10/2006 |

OTHER PUBLICATIONS

EP Search Report dated Feb. 26, 2016.
Office action for EP14783483.2 dated Jul. 14, 2017.

*Primary Examiner* — Todd E Manahan
*Assistant Examiner* — Katheryn A Malatek
(74) *Attorney, Agent, or Firm* — Getz Balich LLC

(57) ABSTRACT

A heat shield for a combustor of a gas turbine engine includes an outer edge surface with an outlet of an edge cooling passage, the edge cooling passage oriented to direct cooling air generally upstream relative to a combustion gas flow.

13 Claims, 7 Drawing Sheets

(56) References Cited

U.S. PATENT DOCUMENTS

| | | |
|---|---|---|
| 7,146,815 B2 | 12/2006 | Burd |
| 7,155,913 B2* | 1/2007 | Beule .................. F23R 3/06 60/754 |
| 7,363,763 B2 | 4/2008 | Coughlan, III et al. |
| 7,849,694 B2 | 12/2010 | Dahlke et al. |
| 7,954,325 B2 | 6/2011 | Burd et al. |
| 8,015,829 B2 | 9/2011 | Coughlan, III et al. |
| 8,113,004 B2 | 2/2012 | Carlisle et al. |
| 8,256,224 B2 | 9/2012 | Garry et al. |
| 2001/0005555 A1 | 6/2001 | Kreis et al. |
| 2001/0029738 A1* | 10/2001 | Pidcock ............. F23R 3/002 60/754 |
| 2005/0022531 A1* | 2/2005 | Burd ................. F23R 3/002 60/752 |
| 2006/0005543 A1 | 1/2006 | Burd |
| 2007/0245742 A1* | 10/2007 | Dahlke ............... F02K 1/82 60/754 |
| 2009/0077974 A1 | 3/2009 | Dahlke et al. |
| 2009/0199837 A1* | 8/2009 | Tschirren ........... F23M 5/08 126/144 |

\* cited by examiner

COMBUSTOR PANEL T-JUNCTION COOLING

This application claims priority to PCT Patent Application No. PTC/US14/33657 filed Apr. 10, 2014, which claims priority to U.S. Patent Appln. No. 61/811,501 filed Apr. 12, 2013.

BACKGROUND

The present disclosure relates to a gas turbine engine and, more particularly, to a cooling arrangement therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section is subject to high thermal loads for prolonged time periods and various cooling arrangements are provided. Among these are impingement cooling on a backside and film cooling on a gas side to maintain temperatures within material limits.

SUMMARY

A heat shield for a combustor of a gas turbine engine according to one disclosed non-limiting embodiment of the present disclosure includes an outer edge surface includes an outlet of an edge cooling passage, the edge cooling passage oriented to direct cooling air generally upstream relative to a combustion gas flow.

A further embodiment of the present disclosure includes a rail that at least partially defines the outer edge surface.

In a further embodiment of any of the foregoing embodiments of the present disclosure, a rail inner surface of the rail includes an inlet of the edge cooling passage.

In a further embodiment of any of the foregoing embodiments of the present disclosure, the edge cooling passage is angled with respect to the outer edge surface.

In a further embodiment of any of the foregoing embodiments of the present disclosure, the edge cooling passage is one of a multiple of edge cooling passages. Each of the multiple of edge cooling passages is directed more upstream relative to the combustion gas flow and to a displacement of each of the multiple of edge cooling passages with respect to a corner of the heat shield.

A combustor for a gas turbine engine according to another disclosed non-limiting embodiment of the present disclosure includes a first heat shield with a multiple of first edge cooling passages, and a second heat shield with a multiple of second edge cooling passages, and a third heat shield which defines a T-junction with respect to the first heat shield and the second heat shield. The third heat shield includes a multiple of third edge cooling passages, at least one of which is oriented to direct cooling air upstream relative to a combustion gas flow.

In a further embodiment of any of the foregoing embodiments of the present disclosure, the multiple of edge cooling passages are located, through a rail of the third heat shield.

In a further embodiment of any of the foregoing embodiments of the present disclosure, the multiple of edge cooling passages are located adjacent a circumferential gap of the T-junction.

In a further embodiment of any of the foregoing embodiments of the present disclosure, the multiple of edge cooling passages are located adjacent an axial gap of the T-junction.

In a further embodiment of any of the foregoing embodiments of the present disclosure, the multiple of edge cooling passages are located adjacent a circumferential gap and an axial gap of the T-junction.

In a further embodiment of any of the foregoing embodiments of the present disclosure, at least one of the multiple of third edge cooling passages is directly opposed to one of the multiple of second edge cooling passages.

In a further embodiment of any of the foregoing embodiments of the present disclosure, each of the multiple of third edge cooling passages are displaced from a corner of the third heat shield.

In a further embodiment of any of the foregoing embodiments of the present disclosure, each of the multiple of third edge cooling passages decreases in angle with respect to an outer edge surface of the third heat shield as each of the multiple of third edge cooling passages are displaced from the corner.

A method of operating a gas turbine engine according to another disclosed non-limiting embodiment of the present disclosure includes purging a combustion gas flow from a gap between heat shields with an edge cooling passage oriented to direct cooling air upstream relative to the combustion gas flow.

A further embodiment of any of the foregoing embodiments of the present disclosure includes purging a T-junction.

A further embodiment of any of the foregoing embodiments of the present disclosure includes transpiration cooling a rail through which the edge cooling passage is situated.

A further embodiment of any of the foregoing embodiments of the present disclosure includes opposing a first edge cooling passage in a first heat shield with a second edge cooling passage in a second heat shield.

A further embodiment of any of the foregoing embodiments of the present disclosure includes directing each of the multiple of edge cooling passages more upstream relative to the combustion gas flow and to a displacement of each of the multiple of edge cooling passages with respect to a corner of the heat shield The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
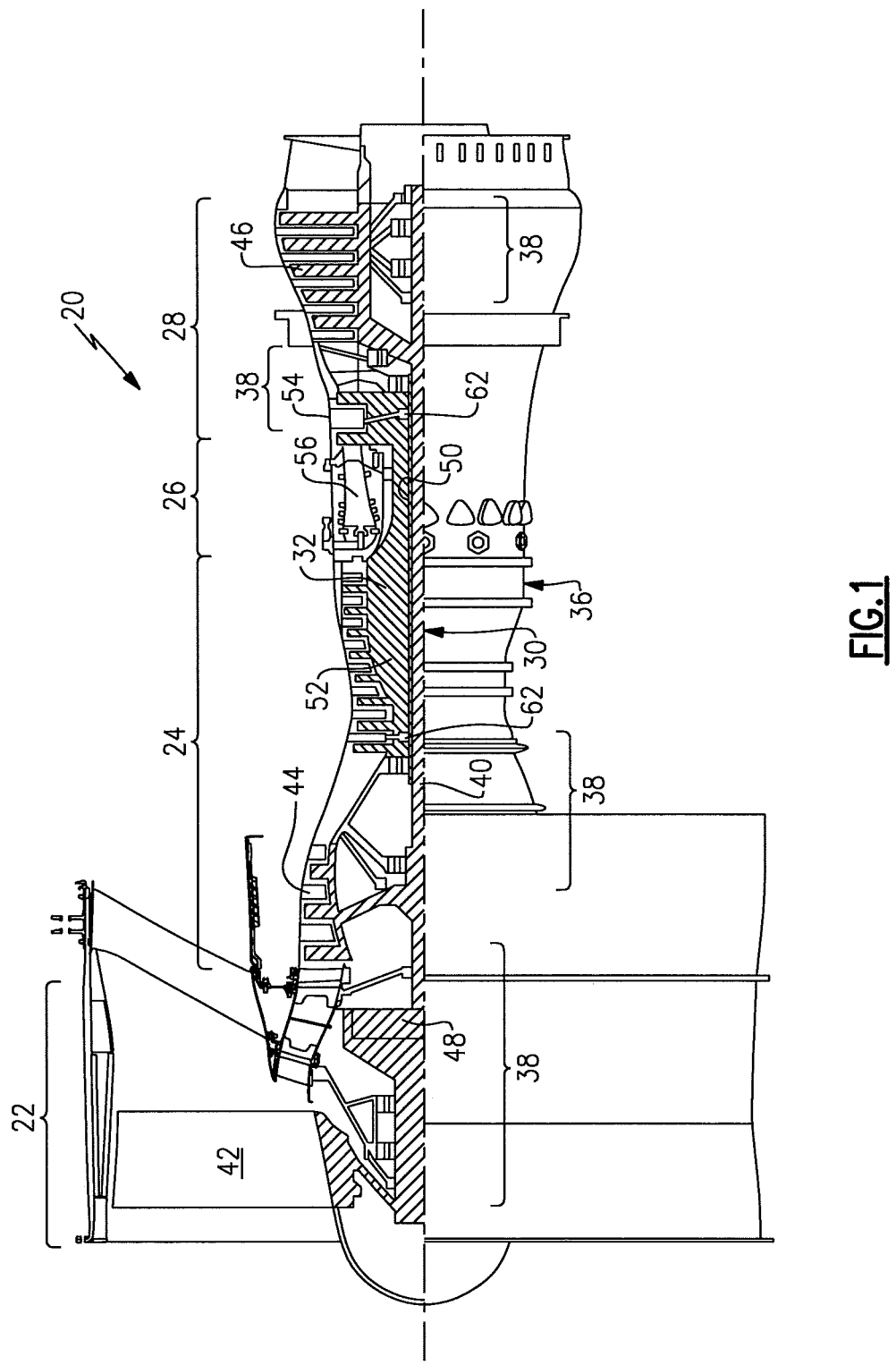
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intemiediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by compartments 38 within the static structure 36. It should be understood that various compartments 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided along the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade in the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $(\text{"Tram"}/518.7)^{0.5}$. The Low Corrected Fan Tip Speed according to one non-limiting embodiment of the example gas turbine engine 20 is less than about 1150 fps (351 m/s).

Figure 2:
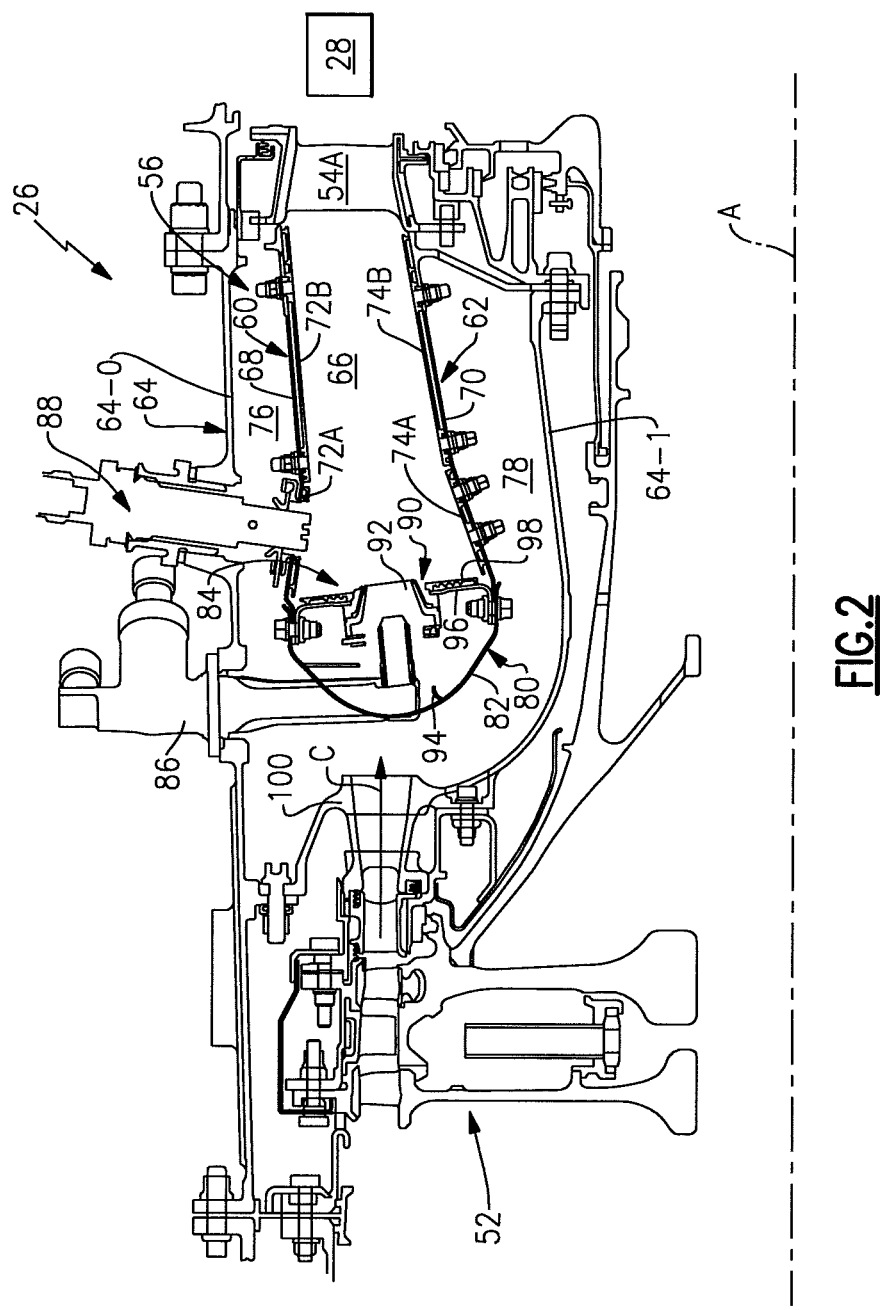
FIG. 2 is a longitudinal schematic sectional view of a combustor section according to one non-limiting embodiment that may be used with the gas turbine engine shown in FIG. 1.

With reference to FIG. 2, the combustor 56 generally includes an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

Figure 3:
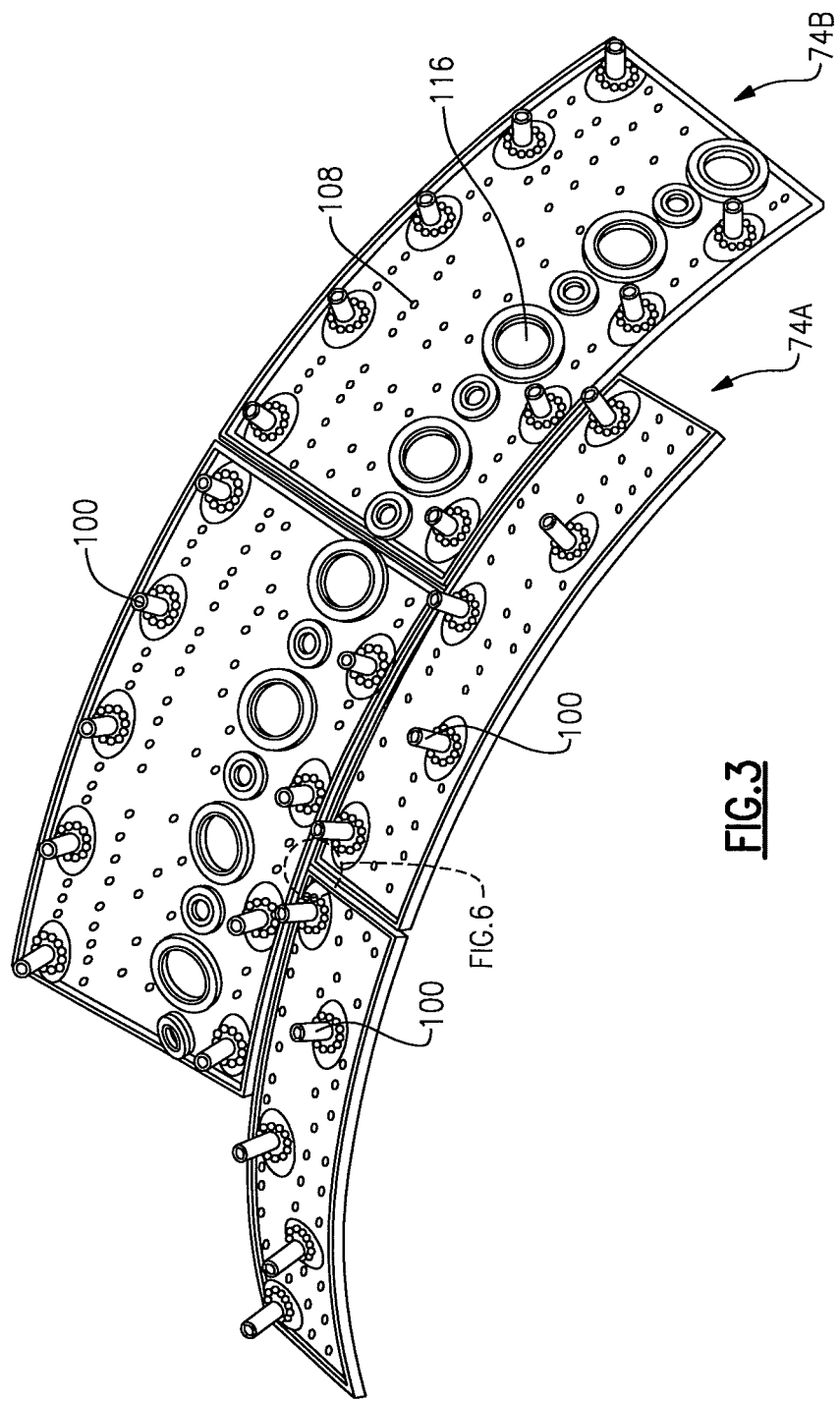
FIG. 3 is an expanded perspective view of a portion of a heat shield array of a combustor liner assembly from a cold side.
Figure 4:
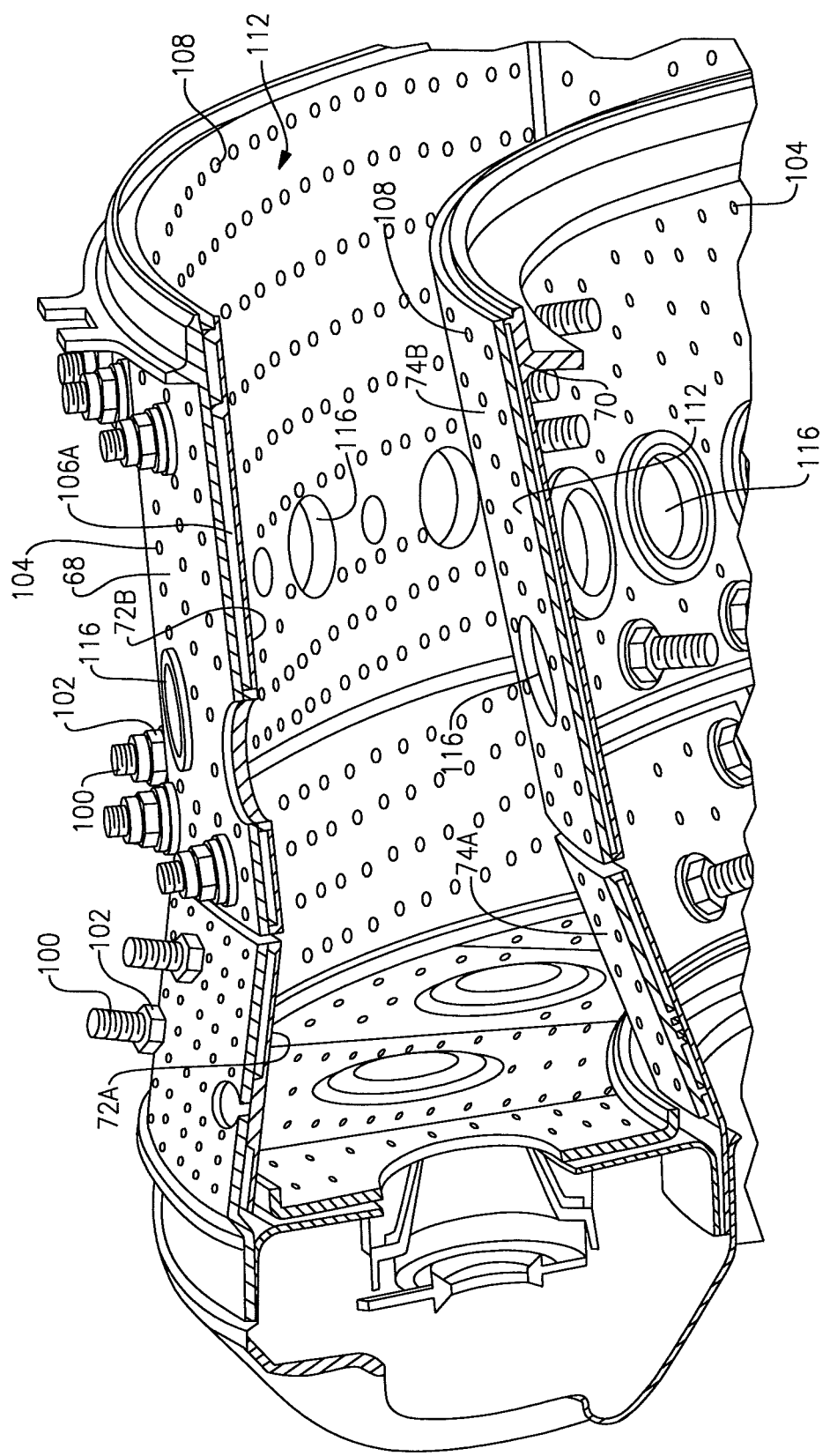
FIG. 4 is a perspective longitudinal schematic sectional view of the combustor section.

The combustor liner assemblies 60, 62 contain the combustion products for direction toward the turbine section 28. Each combustor liner assembly 60, 62 generally includes a respective support shell 68, 70 which supports one or more heat shields 72, 74 mounted to a hot side of the respective support shell 68, 70. Each of the heat shields 72, 74 may be generally rectilinear and manufactured of, for example, a nickel based super alloy, ceramic or other temperature resistant material and are arranged to form a liner array. In one disclosed non-limiting embodiment, the liner array includes a multiple of forward heat shields 72A and a multiple of aft heat shields 72B that are circumferentially staggered (FIG. 3) to line the hot side of the outer support shell 68 (FIG. 4). A multiple of forward heat shields 74A and a multiple of aft heat shields 74B are circumferentially staggered to line the hot side of the inner support shell 70 (FIG. 4).

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured to the combustor liner assemblies 60, 62, and a multiple of circumferentially distributed bulkhead heat shields 98 secured to the bulkhead support shell 96 around the central opening 92.

The annular hood 82 extends radially between, and is secured to, the forwardmost ends of the combustor liner assemblies 60, 62. The annular hood 82 includes a multiple of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective fuel nozzle guide 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Spark energy is provided to the combustor 56 through an igniter 88 that extends through at least one of the multiple of radially outward forward heat shields 72A. The igniter 88 such as a frequency-pulsed igniter provides a continuous spark or other ignition source. The igniter 88 may be located in a multiple of circumferential locations around the combustor 56 in one or more outward forward heat shields 72A.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

With reference to FIG. 4, a multiple of studs 100 extend from the heat shields 72, 74. The multiple of studs 100 mount the heat shields 72, 74 to the respective support shells 68, 70 with fasteners 102 such as nuts. That is, the studs 100 project rigidly from the heat shields 72, 74 and through the respective support shells 68, 70 to receive the fasteners 102 at a threaded distal end section thereof.

A multiple of cooling impingement passages 104 penetrate through the support shells 68, 70 to allow air from the respective annular plenums 76, 78 (FIG. 3) to enter cavities 106A, 106B formed in the combustor liner assemblies 60, 62 between the respective support shells 68, 70 and heat shields 72, 74.

The cooling impingement passages 104 are generally normal to the surface of the heat shields 72, 74. The air in the cavities 106A, 106B provides backside impingement cooling of the heat shields 72, 74 that is generally defined herein as heat removal via internal convection.

A multiple of cooling film passages 108 penetrate through each of the heat shields 72, 74. The geometry of the film passages, e.g, diameter, shape, density, surface angle, incidence angle, etc., as well as the location of the passages with respect to the high temperature combustion flow also contributes to effusion film cooling. The combination of cooling impingement passages 104 and cooling film passages 108 within the respective support shells 68, 70 and heat shields 72, 74 may often be referred to as an Impingement Film Floatliner assembly.

A multiple of dilution apertures 116 penetrate through both the respective support shells 68, 70 and heat shields 72, 74 along a common axis. For example only, in a Rich-Quench-Lean (R-Q-L) type combustor, the dilution apertures 116 (best seen in FIG. 3) are located downstream of the forward assembly 80 to quench the combustion gases to supply cooling air into the combustor 56. It should be understood that other combustor types will also benefit herefrom.

Figure 5:
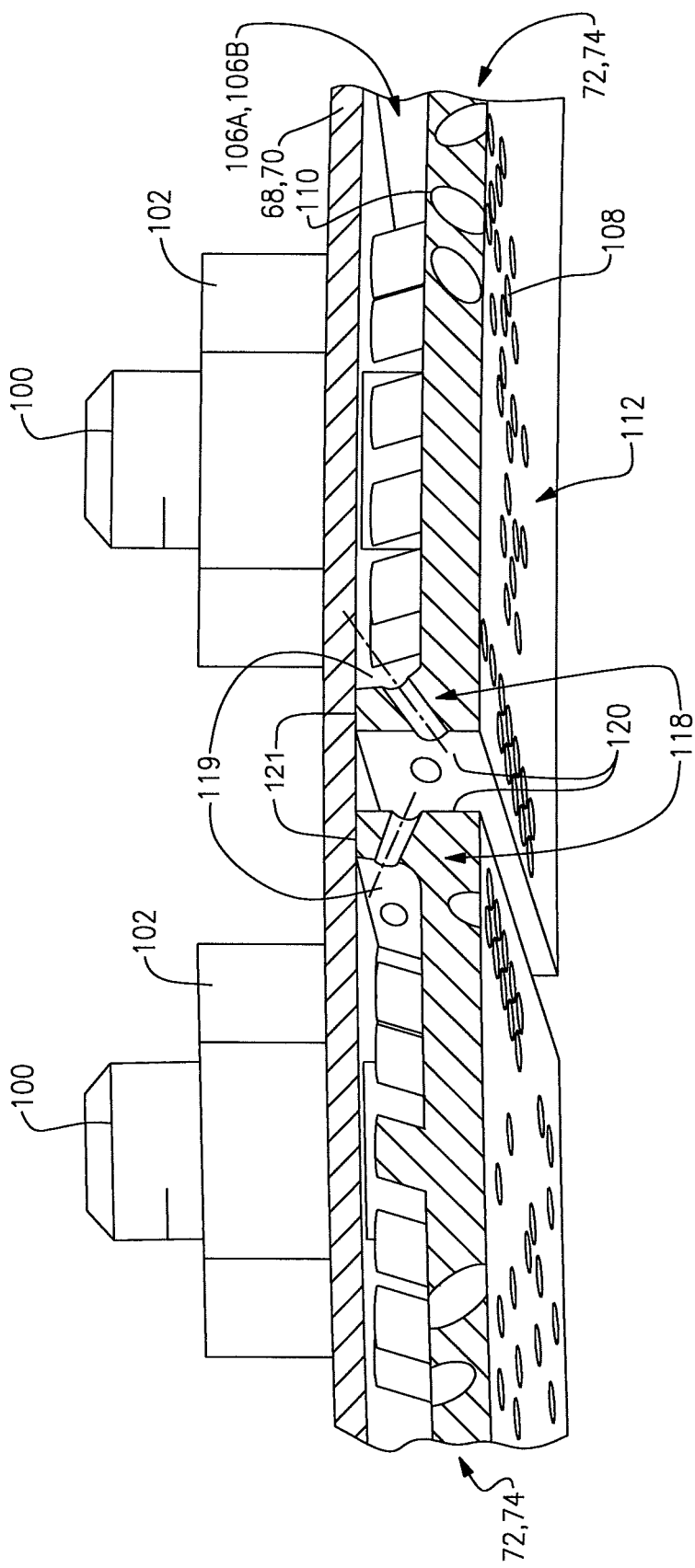
FIG. 5 is an expanded sectional view of a heat shield array adjacent to a T-junction according to one non-limiting embodiment.

With reference to FIG. 5, the cooling film passages 108 allow the cooling air to pass from the cavities 106A, 106B defined in part by a cold side 110 of the heat shields 72, 74 to a hot side 112 of the heat shields 72, 74 and thereby facilitate the formation of a film of cooling air along the hot side 112.

The heat shields 72, 74 include a rail 118 defined about a periphery thereof to form an outer edge surface 120 of the heat shields 72, 74. That is, the outer edge surface 120 of each heat shield 72, 74 may be an edge that faces and is directly opposed to an adjacent edge surface of adjacent heat shields 72, 74.

The outer edge surface 120 is contiguous with and generally perpendicular to the hot side 112. The outer edge surface 120 and the hot side 112 are exposed to combustion gas flow. Opposite the outer edge surface 120, a rail inner surface 119 may be contiguous and generally perpendicular to the cold side 110. The outer edge surface 120 and the rail inner surface 119 at least partially bound the cavities 106A, 106B. Between the outer edge surface 120 and the rail inner surface 119, a rail interface surface 121 generally parallel to the cold side 110 and hot side 112 contacts the support shells 68, 70 to seal the cavities 106A, 106B to the support shells 68, 70.

The cooling film passages 108 are generally more numerous than the cooling impingement passages 104 to promote the development of a film cooling along the hot side 112 to sheath the heat shields 72, 74 on a combustion gas side. Film cooling as defined herein is the introduction of a relatively cooler airflow at one or more discrete locations along a surface exposed to a high temperature environment to protect that surface in the immediate region of the airflow injection as well as downstream thereof.

Figure 6:
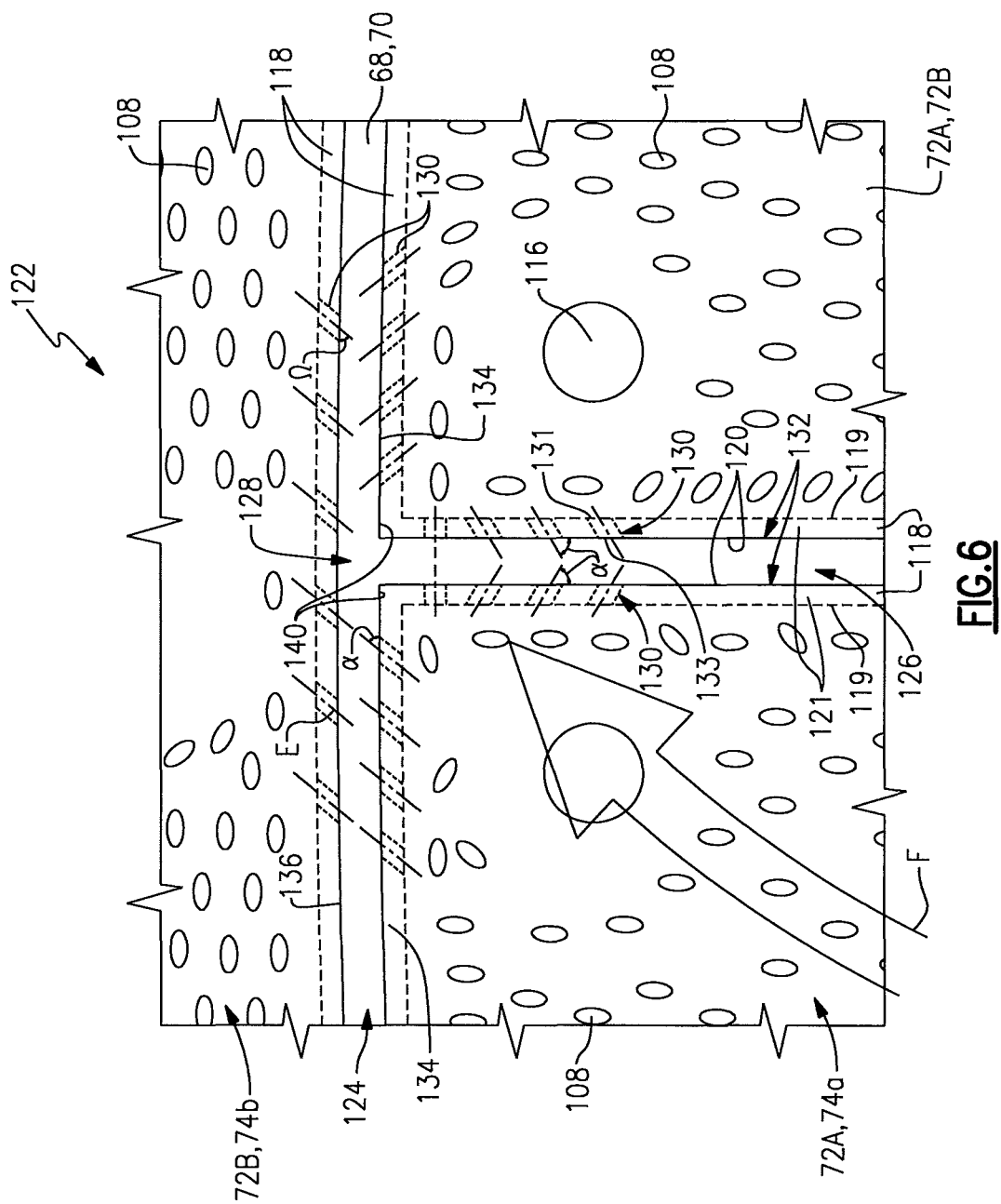
FIG. 6 is an expanded perspective view of a heat shield array from a hot side adjacent to a T-junction.

With reference to FIG. 6, an interface 122 between the multiple of forward heat shields 72A, 74A and the multiple of aft heat shields 72B, 74B (one shown) defines a circumferential gap 124 and an axial gap 126 that is referred to herein as a T-junction 128. The T-junctions 128 are particularly subject to thermal distress. This thermal distress effects both the support shells 68, 70 and heat shields 72, 74 proximate the T-junction 128.

A multiple of edge cooling passages 130 are located through each rail 118 adjacent the T-junction 128 to mitigate this thermal distress. The multiple of edge cooling passages 130 are arranged on each side of the circumferential gap 124 and the axial gap 126 to provide effusion cooling. Each of the multiple of edge cooling passages 130 includes an inlet 131 in the rail inner surface 119 and a respective outlet 133 in the outer edge surface 120. It should be appreciated that the inlet 131 and respective outlet 133 may be differentially displaced with respect to the hot side 112. That is, the inlet 131/outlet 133 may be closer to the hot side 112 than the respective outlet 133/inlet 131.

In one disclosed non-limiting embodiment, an axial edge 132 of each of the forward heat shields 72A, 74A include opposed edge cooling passages 130 across the axial gap 126. A circumferential edge 134 of each of the forward heat shields 72A, 74A and a circumferential edge 136 of an adjacent aft heat shield 72B, 74B include opposed edge cooling passages 130 across the circumferential gap 124.

Figure 7:
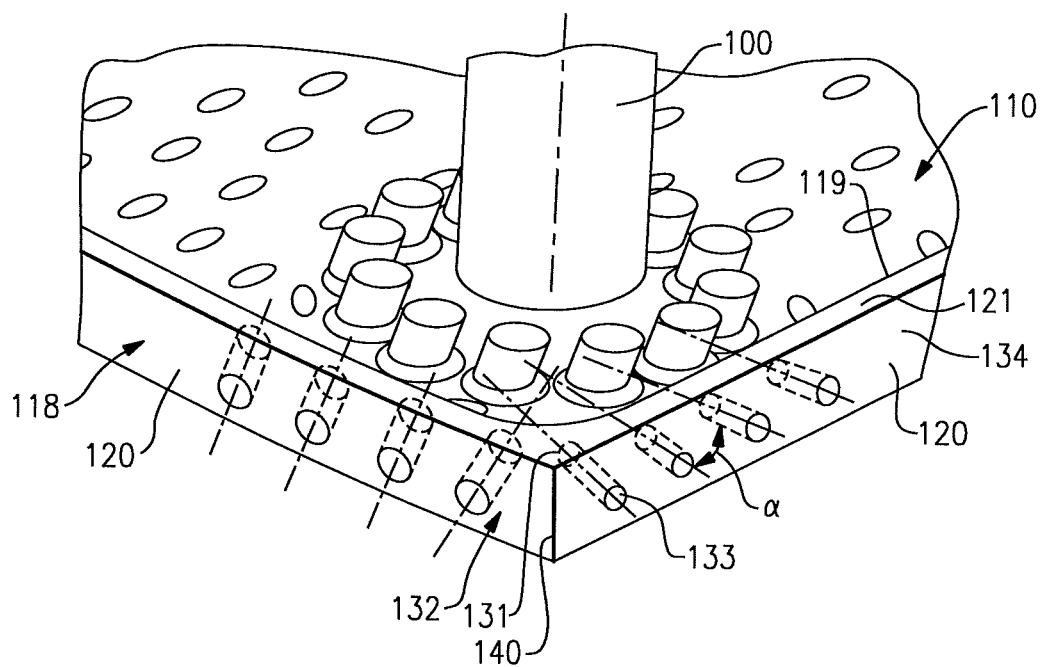
FIG. 7 is an expanded perspective view of a corner of a heat shield from a cold side.

Each of the multiple of edge cooling passages 130-2 along the axial gap 126 are oriented generally upstream relative to the combustion gas flow (illustrated schematically by arrow F). That is, each of the multiple of edge cooling passages 130 define an axis E that are directed in an upstream direction to purge entrapped hot air from the panel T-junction 128. In one disclosed non-limiting embodiment, an opposed pair of the multiple of edge cooling passages 130 located closest to a corner 140 (FIG. 7) are closest to being directly opposed, e.g., about 90° with respect to the axial edge 132. Then, as the multiple of edge cooling passages 130 are displaced further upstream of the combustion gas flow F from the corner 140, the respective opposed pair of the multiple of edge cooling passages 130 decrease in angle $\alpha$ with respect to the axial edge 132, e.g., about 45° or less with respect to the axial edge 132. It should be appreciated that various angles and numbers of opposed pairs of edge cooling passages 130 will benefit herefrom. Furthermore, the opposed pairs of the multiple of edge cooling passages 130 need not be directly opposite each other and may be staggered.

Again, as the multiple of edge cooling passages 130 are displaced further from the corner 140, the respective edge cooling passages 130-1 decrease in angle $\alpha$ with respect to a distance from the axial edge 132, e.g., from about 90° with respect to the circumferential edge 134 closest to the corner 140 to about 45° or less furthest from the corner 140. It should be appreciated that various angles and numbers of edge cooling passages 130 along the circumferential gap 124 will benefit herefrom.

Each of the multiple of edge cooling passages 130 along the circumferential edge 136 of the aft heat shield 72B, 74B adjacent to the circumferential gap 124 are oriented to generally oppose the combustor gas flow F swirl in the circumferential direction. In this disclosed non-limiting embodiment, the multiple of edge cooling passages 130 define a generally equivalent angle $\Omega$ along the circumferential edge 136.

The cooling airflow through the edge cooling passages 130 in the rails 118 purges the gaps 124, 126 of combustion gas and transpiration cools the rails 118. Both effects operate to reduce the metal temperature by, in one example, about 150 F (65 C). That is, the cooling airflow through the edge cooling passages 130 actively counters the combustion gas flow F to more effectively purge combustion gases entrenched in the gaps 124, 126.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A heat shield for a combustor of a gas turbine engine comprising: a heat shield base configured with a cold side, a hot side and a plurality of cooling film
    passages that penetrate through the heat shield base and pass from the cold side to the hot side, the heat shield base extending axially along a centerline of the gas turbine engine between an upstream end with respect to a combustion gas flow and a downstream end with respect to the combustion gas flow of the heat shield base, and the heat shield base extending circumferentially about the centerline between opposing sides of the heat shield base between the upstream end and the downstream end; and
    a rail extending axially along one of the opposing sides of the heat shield base, the rail projecting out from the cold side, the rail comprising an outer edge surface including an outlet of an edge cooling passage, said edge cooling passage extending through the rail and oriented to direct cooling air upstream relative to the combustion gas flow, wherein the edge cooling passage is acutely angled relative to the outer edge surface when viewed in a plane tangent to the hot side at a point on the rail.

2. The heat shield as recited in claim 1, wherein
    the rail further comprises a rail inner surface positioned opposite the outer edge surface; and
    the rail inner surface includes an inlet of said edge cooling passage and is adjacent the cold side.

3. The heat shield as recited in claim 1, wherein
said edge cooling passage is one of a plurality of edge cooling passages that extend through the rail; and
each of said plurality of edge cooling passages is oriented to direct said cooling air upstream relative to the combustion gas flow; and
each of said plurality of edge cooling passages is acutely angled relative to the outer edge surface.

4. The heat shield as recited in claim 1, wherein the edge cooling passage is acutely angled relative to the outer edge surface in both a first direction and a second direction that is perpendicular to the first direction.

5. A combustor for a gas turbine engine comprising:
a first heat shield comprising a first rail with a plurality of first edge cooling passages that extend through the first rail;
a second heat shield comprising a second rail with a plurality of second edge cooling passages that extend through the second rail; and
a third heat shield which defines a T-junction with respect to said first heat shield and said second heat shield, said third heat shield comprising a third rail with a plurality of third edge cooling passages that extend through the third rail, wherein a first of said plurality of third edge cooling passages is oriented to direct cooling air upstream relative to a combustion gas flow, and wherein the plurality of third edge cooling passages are arranged axially along a gap, wherein the gap is between an outer edge surface of the second heat shield and an outer edge surface of the third heat shield, and wherein the outer edge surface of the second heat shield and the outer edge surface of the third heat shield each run along an axial centerline of the gas turbine engine;
wherein the third heat shield further includes a cold side, a hot side and a plurality of cooling film passages that penetrate through the third heat shield and pass from the cold side to the hot side; and
wherein the first of the plurality of third edge cooling passages is acutely angled relative to a surface of the third rail when viewed in a plane tangent to the hot side at a point on the third rail.

6. The combustor as recited in claim 5, wherein the first of said plurality of third edge cooling passages is directly opposed to one of said plurality of second edge cooling passages.

7. The combustor as recited in claim 5, wherein each of said plurality of third edge cooling passages are displaced from a corner of said third heat shield.

8. The combustor as recited in claim 7, wherein
a centerline of the first of said plurality of third edge cooling passages is disposed at a first angle with respect to said outer edge surface of said third heat shield;
a centerline of a second of said plurality of third edge cooling passages is disposed at a second angle with respect to said outer edge surface of said third heat shield;
said second angle is less than said first angle; and
said second of said plurality of third edge cooling passages is located further from said corner than said first of said plurality of third edge cooling passages.

9. A method of operating a gas turbine engine, comprising: purging a combustion gas flow from a gap, the first heat shield configured with an edge cooling passage extending through a rail of the first heat shield, wherein the edge cooling passage is oriented to direct cooling air into the gap and upstream relative to the combustion gas flow, wherein the gap is between an edge of the first heat shield and an edge of the second heat shield, and wherein the edge of the first heat shield and the edge of the second heat shield each run along an axial centerline of the gas turbine engine; and
passing the cooling air from a cavity, defined in part by a cold side of the first heat shield, through a plurality of cooling film passages in the first heat shield to a hot side of the first heat shield to provide effusion film cooling to the hot side of the first heat shield;
wherein the edge cooling passage is acutely angled relative to a surface of the rail when viewed in a plane tangent to the hot side at a point on the rail.

10. The method as recited in claim 9, further comprising: purging a T-junction.

11. The method as recited in claim 9, further comprising: transpiration cooling the rail through which the edge cooling passage is situated.

12. The method as recited in claim 9, further comprising: opposing the edge cooling passage in the first heat shield with a second edge cooling passage in the second heat shield.

13. The method as recited in claim 9, further comprising: directing the cooling air through a plurality of additional edge cooling passages in the first heat shield upstream relative to the combustion gas flow; and
wherein each of the plurality of additional edge cooling passages is displaced with respect to a corner of said first heat shield.

* * * * *